US00RE50023E

(19) United States
(12) Reissued Patent
Kim et al.

(10) Patent Number: US RE50,023 E
(45) Date of Reissued Patent: *Jun. 25, 2024

(54) PIPE FIXING DEVICE

(71) Applicant: SAMSUNG ELECTRONICS CO., LTD., Suwon-si (KR)

(72) Inventors: Mun Sub Kim, Ansan-Si (KR); Jai Kwon Lee, Suwon-si (KR); Jin Yong Mo, Anyang-Si (KR); Deug Yong Park, Suwon-Si (KR); Hyung Suk Han, Suwon-Si (KR); Ju Hwan Kim, Suwon-Si (KR)

(73) Assignee: SAMSUNG ELECTRONICS CO., LTD., Suwon-si (KR)

( * ) Notice: This patent is subject to a terminal disclaimer.

(21) Appl. No.: 17/372,218

(22) Filed: Jul. 9, 2021

Related U.S. Patent Documents

Reissue of:
(64) Patent No.: 7,191,988
Issued: Mar. 20, 2007
Appl. No.: 11/110,708
Filed: Apr. 21, 2005

U.S. Applications:
(63) Continuation of application No. 16/510,441, filed on Jul. 12, 2019, now Pat. No. Re. 48,660, which is an application for the reissue of Pat. No. 7,191,988.

(30) Foreign Application Priority Data

May 28, 2004 (KR) ..... 10-2004-0038433

(51) Int. Cl.
*F16L 3/22* (2006.01)
*F16L 3/08* (2006.01)

(52) U.S. Cl.
CPC ..... *F16L 3/085* (2013.01); *Y10S 248/913* (2013.01)

(58) Field of Classification Search
CPC ..... F16L 3/085; F16L 3/10; F16L 3/02; F16L 3/08; Y10S 248/913; Y10T 403/7129; Y10T 403/7135; Y10T 403/7141; Y10T 403/7147; Y10T 403/7171; Y10T 403/7176; Y10T 403/7182; Y10T 403/7188; Y10T 403/7194;
(Continued)

(56) References Cited

U.S. PATENT DOCUMENTS 3,096,110 A * 7/1963 Cantor ..... 403/385
3,298,074 A * 1/1967 Kedem ..... 403/376
(Continued)

FOREIGN PATENT DOCUMENTS

DE 9207690 * 11/1992 ..... F16L 3/085
JP S5869773 U 5/1983
(Continued)

*Primary Examiner* — Catherine S Williams
(74) *Attorney, Agent, or Firm* — Sughrue Mion, PLLC

(57) ABSTRACT

A pipe fixing device comprising a plurality of pipes, for conducting liquid or gas, arranged to cross each other, and a fixing member for fixing the plurality of pipes. The fixing member comprises a plurality of pipe fixing bores, and a plurality of fitting bores for the fitting of bands used to tighten the pipes. The present invention can secure not only easy insertion of the pipes arranged to cross each other, but also enhancement in a coupling force of the pipes through the use of the tightening bands, resulting in stable and reliable fixation of the pipes.

5 Claims, 4 Drawing Sheets

(58) Field of Classification Search
CPC ..... Y10T 403/7152; Y10T 403/7158; Y10T 403/7164
See application file for complete search history.

(56) References Cited

U.S. PATENT DOCUMENTS

| | | | | | |
|---|---|---|---|---|---|
| 3,876,321 | A | | 4/1975 | Haines | |
| 4,077,730 | A | * | 3/1978 | Zaidan | 403/385 |
| 4,483,334 | A | * | 11/1984 | Murray | 606/59 |
| 4,575,035 | A | * | 3/1986 | McDonough | 248/287.1 |
| 4,578,896 | A | * | 4/1986 | Brown | 47/45 |
| 4,819,897 | A | * | 4/1989 | Gooding | F16B 7/0433 280/421 |
| 4,946,122 | A | * | 8/1990 | Ramsey et al. | F16M 13/02 248/230.1 |
| 5,310,151 | A | * | 5/1994 | Engel | 248/230.8 |
| 5,395,018 | A | * | 3/1995 | Studdiford | 224/420 |
| 5,498,098 | A | * | 3/1996 | Cairns | 403/400 |
| D417,141 | S | * | 11/1999 | Senninger | D8/395 |
| 6,195,846 | B1 | * | 3/2001 | Studdiford et al. | 24/16 R |

FOREIGN PATENT DOCUMENTS

| | | | | |
|---|---|---|---|---|
| JP | S61150508 U | | 9/1986 | |
| JP | 2000320731 | * | 11/2000 | F16L 3/10 |
| KR | 1999-0015632 U | | 5/1999 | |
| KR | 200147626 | * | 6/1999 | F16L 3/085 |
| KR | 1999-0037817 U | | 10/1999 | |
| KR | 19990037817 | * | 10/1999 | |

* cited by examiner

PIPE FIXING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 7,191,998, which was filed as U.S. application Ser. No. 11/110,708 on Apr. 21, 2005 and issued on Mar. 20, 2007. The reissue applications are this application and U.S. application Ser. No. 16/510,441 filed on Jul. 12, 2019, which is a reissue application of U.S. Pat. No. 7,191,988. This application is a continuation of U.S. application Ser. No. 16/510,441 and a reissue application of U.S. Pat. No. 7,191,988.*

CROSS-REFERENCE TO RELATED APPLICATION

This application claims the benefit of Korean Patent Application No. 2004-38433, filed on May 28, 2004 in the Korean Intellectual Property Office, the disclosure of which is incorporated herein by reference.

BACKGROUND OF THE INVENTION

1. Field of the Invention

The present invention relates to a pipe fixing device and, more particularly, to a pipe fixing device which is used to fix a plurality of pipes arranged to cross each other.

2. Description of the Related Art

Appliances, such as air conditioners, refrigerators, etc., are often provided with pipes for conducting liquid or gas.

In general, such pipes are mounted inside a casing so that they connect a compressor and a heat exchanger. They also connect solenoid valves, capillary tubes, etc. to each other, which are used to guide a stream of coolant into the compressor and the heat exchanger or adjust a flow rate of the coolant. As driving of the compressor may give rise to collision between the pipes, and these pipes are welded to various devices, vibration of the pipes can disadvantageously apply an impact to welded portions, resulting in a possibility of cracks at the welded portions.

Taking into account the above problem, a pipe fixing member, which is attached to one side of a casing and is adapted to fix pipes, has been disclosed in the prior art, but this existing pipe fixing member is troublesome and complex in overall installation thereof. As an alternative solution, a fixing member for coupling a plurality of pipes has been developed. The fixing member, however, also has a problem in that its application range is limited to fix pipes arranged in parallel inside a casing, and thus it cannot fix pipes arranged to cross each other. For this reason, there still exists a need to develop a fixing member for stably and securely fixing pipes arranged to cross each other.

SUMMARY OF THE INVENTION

The pipe fixing device disclosed herein has been made in view of the above mentioned problems. One aspect of this device is to provide a pipe fixing device for fixing a plurality of pipes arranged to cross each other.

The pipe fixing device comprises a plurality of pipes arranged to cross each other, and a fixing member for fixing the plurality of pipes. The fixing member comprises a body, a plurality of fixing bores formed in the body corresponding to arrangement of the plurality of pipes, and a plurality of fitting bores formed in the body corresponding to arrangement of the plurality of pipes.

The plurality of fixing bores may be formed in a longitudinal direction of the respective pipes, and the plurality of fitting bores may be formed in a diametrical direction of the respective pipes.

One of the plurality of fixing bores and one of the plurality of fitting bores may form a pair with each other, the fixing bore and the fitting bore of the pair being formed to cross each other.

The pipe fixing device may also include a plurality of bands configured to secure the plurality of pipes to the body.

The fixing member may further comprise a plurality of recesses formed at the body thereof for preventing movement of the bands which may be used to tighten the respective pipes.

Another embodiment provides a pipe fixing device comprising a fixing member for fixing first and second pipes arranged to cross each other, the fixing member comprising a body, a first fixing bore vertically perforated through the body for fixing the first pipe, a first fitting bore horizontally perforated through the body near the first fixing bore so as to cross thereto, a second fixing bore horizontally perforated through the body for fixing the second pipe and a second fitting bore vertically perforated through the body near the second fixing bore so as to cross thereto.

The fixing member may further comprise slits formed at one side of the respective first and second fixing bores for securing easy insertion of the pipes.

To the first fitting bore may be fitted a first band for tightening the first pipe, and to the second fitting bore may be fitted a second band for tightening the second pipe, the first and second fitting bores being formed so as to cross each other.

The fixing member may further comprise a plurality of recesses formed at the body thereof for preventing movement of the first and second bands.

BRIEF DESCRIPTION OF THE DRAWINGS

The above aspects and other features and advantages of the pipe fixing device as disclosed herein will become more apparent after reading the following detailed description when taken in conjunction with the drawings, in which.

DETAILED DESCRIPTION OF ILLUSTRATIVE, NON-LIMITING EMBODIMENTS

Illustrative, non-limiting embodiments of the pipe fixing device as disclosed herein will now be described in detail with reference to the annexed drawings.

Figure 1:
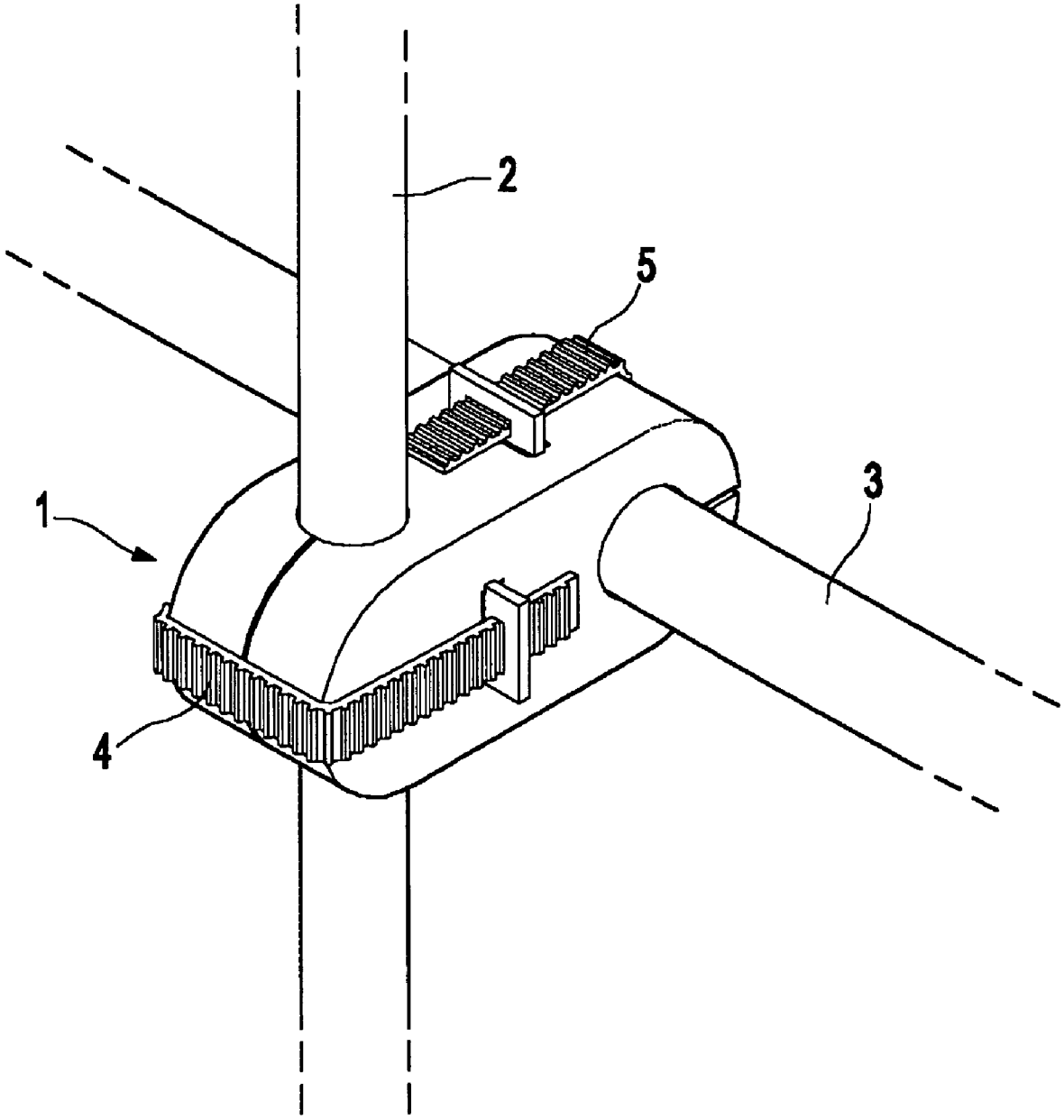
FIG. 1 is a partially broken away perspective view illustrating a pipe fixing device as disclosed herein used to fix a plurality of pipes.

FIG. 1 is a partially broken away perspective view illustrating a pipe fixing device as disclosed herein in a state wherein it is used to fix a plurality of pipes.

As shown in FIG. 1, the pipe fixing device comprises a fixing member 1, which fixes a plurality of pipes, namely, first and second pipes 2 and 3 arranged in vertical and horizontal directions to cross each other. The fixing member 1 is made of a rubber material. However, the invention is not limited thereto, and other well known materials could be used. Tightening bands, namely, first and second bands 4 and 5 are provided around the fixing member 1 in order to surround the pipes 2 and 3. In an exemplary embodiment of the present invention a cable-tie is used, but the invention is not limited thereto, and any other bands are acceptable if they can tighten around the pipes.

At opposite sides of the fixing member 1 are formed a plurality of fixing bores, and a plurality of fitting bores for use in the fixation of the pipes 2 and 3. The plurality of fixing bores are defined in a longitudinal direction of the respective pipes to be fixed, whereas the plurality of fitting bores are defined in a diametrical direction of the respective pipes. Here, one of the plurality of fixing bores and one of the plurality of fitting bores form a pair with each other, and the fixing bore and fitting bore of the pair are formed so as to cross each other.

Figure 2:
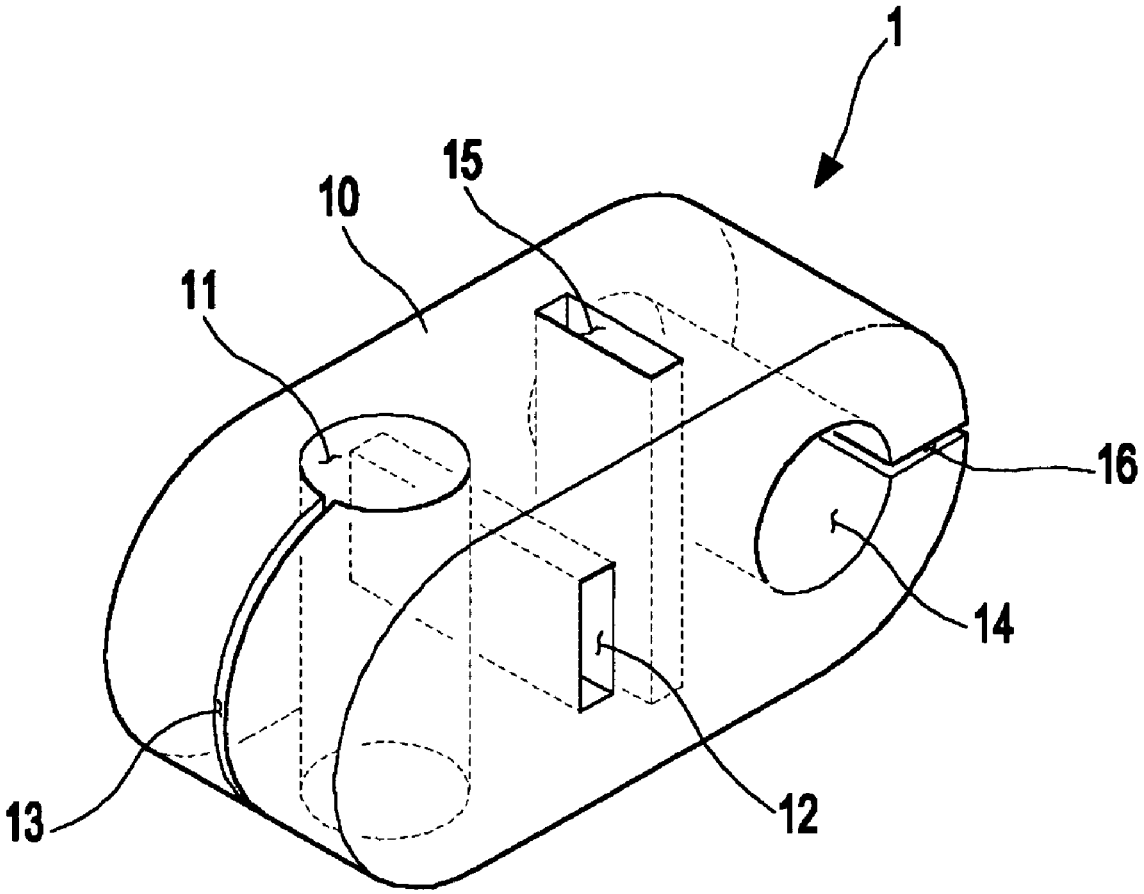
FIG. 2 is a perspective view illustrating a pipe fixing member consistent with a first embodiment of the pipe fixing device disclosed herein.

Referring to FIG. 2, the fixing member 1 comprises a body 10, a first fixing bore 11 which is vertically perforated through the body 10 for fixing the first pipe 2, a first fitting bore 12 which is horizontally perforated through the body 10 near the first fixing bore 11 so as to cross thereto, and a first slit 13 which is formed at one side of the first fixing bore 11 for securing easy insertion of the first pipe 2. The fixing member 1 also comprises a second fixing bore 14 which is horizontally perforated through the body 10 for fixing the second pipe 3, a second fitting bore 15 which is vertically perforated through the body 10 near the second fixing bore 14 so as to cross thereto, and a second slit 16 which is formed at one side of the second fixing bore 14 for securing easy insertion of the second pipe 3.

To the first fitting bore 12 is fitted the first band 4 for tightening the body 10 around the first pipe 2, and to the second fitting bore 15 is fitted the second band 5 for tightening the body 10 around the second pipe 3. As the first and second bands 4 and 5 act to tighten around the pipes 2 and 3, the first and second slits 13 and 16 formed at one side of the respective pipe fixing bores 11 and 14 are narrowed until they are completely closed, thereby allowing the pipes 2 and 3 inside the fixing bores 11 and 14 to be compressed.

Figure 3:
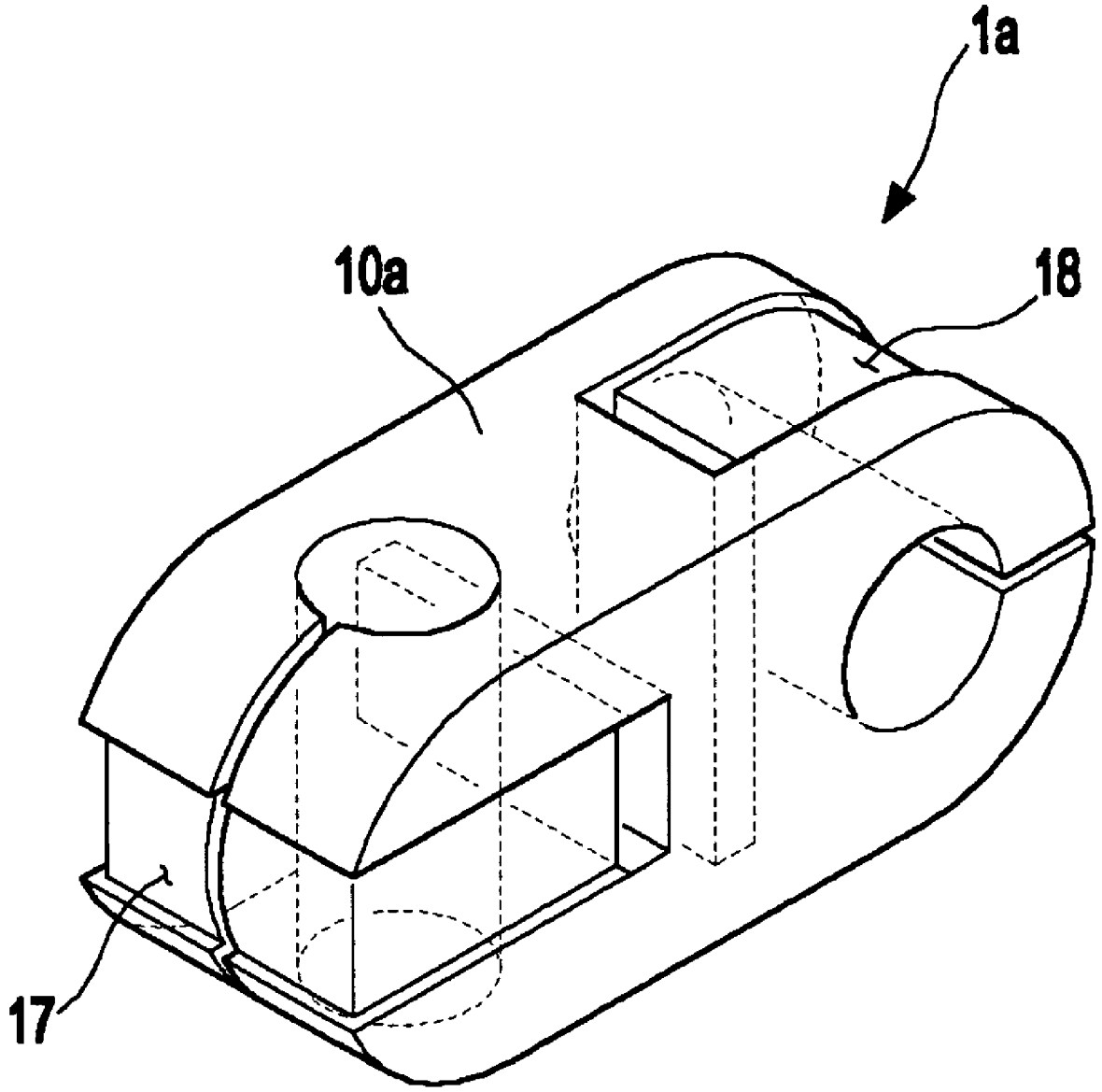
FIG. 3 is a perspective view illustrating a pipe fixing member consistent with a second embodiment of the pipe fixing device disclosed herein.

FIG. 3 illustrates another embodiment of the pipe fixing device disclosed herein. In the embodiment illustrated in FIG. 3, a fixing member 1 a includes a plurality of recesses, namely, first and second recesses 17 and 18, which are formed at body 10a for preventing movement of the tightening bands 4 and 5 (not shown). The first recess 17 is formed along part of an outer periphery of the body 10a in a diametrical direction of the pipe 2 to be inserted through the first fixing bore 11, and the second recess 18 is formed along part of the outer periphery of the body 10a in a diametrical direction of the pipe 3 to be inserted through the second fixing bore 14.

Figure 4:
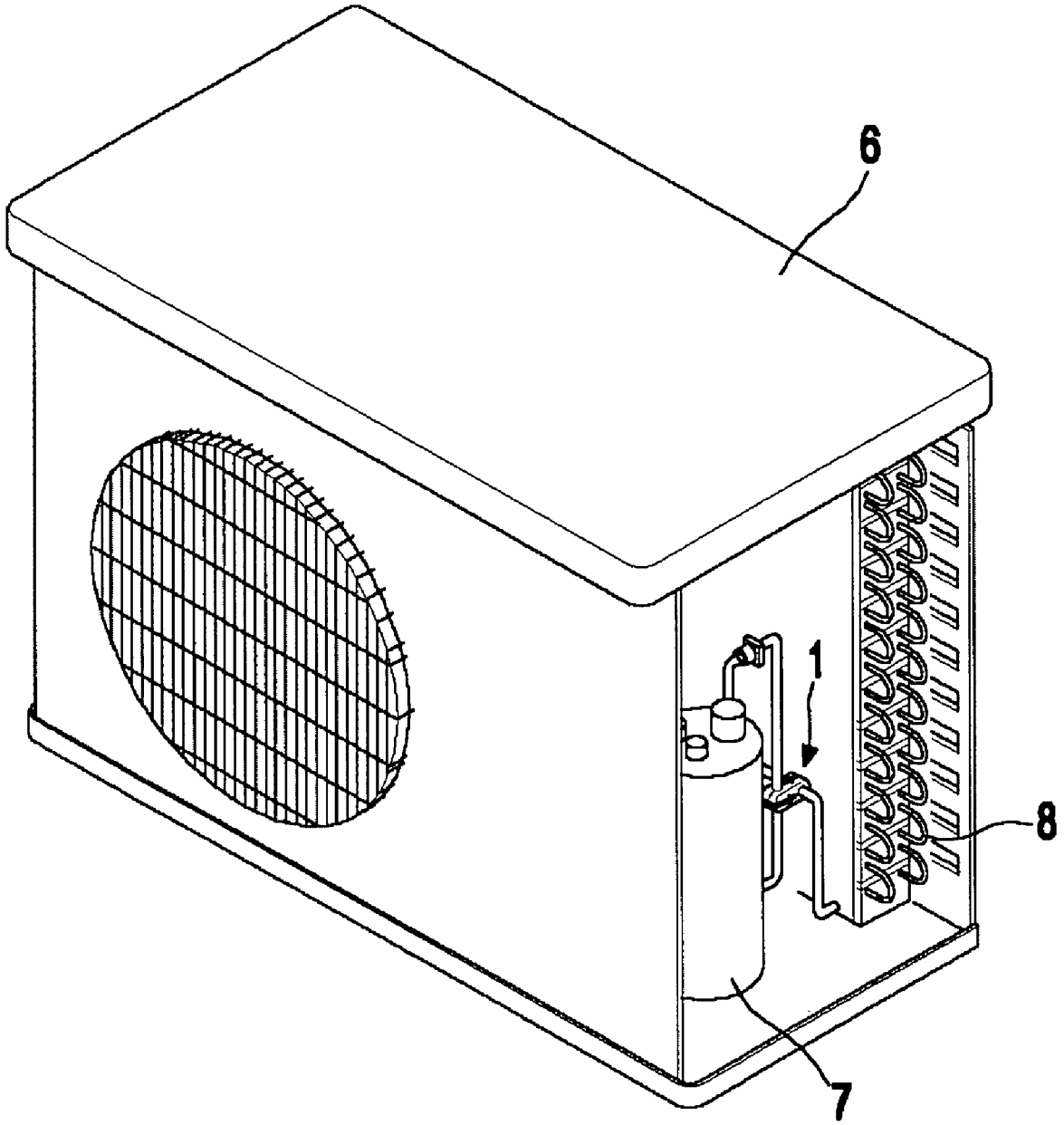
FIG. 4 is a perspective view illustrating an application wherein a pipe fixing device as disclosed herein is used to fix coolant pipes connecting a compressor and a heat exchanger of an air conditioner.

FIG. 4 illustrates an application wherein the pipe fixing device of the present invention is used to fix coolant pipes connecting a compressor and a heat exchanger of an air conditioner.

Inside an outdoor unit casing 6 are mounted various driving devices, such as a compressor 7 and a heat exchanger 8. Disposed between the compressor 7 and the heat exchanger 8 are a plurality of coolant pipes arranged so as to cross each other. These coolant pipes are fixed together by the fixing member 1 or 1a consistent with the present invention.

Even if vibration is inevitably generated during the operation of the compressor 7, the coolant pipes are fixedly coupled by the fixing member 1 or 1a, resulting in reduction in vibration thereof.

As apparent from the above description, the pipe fixing device in accordance with the present invention, comprises a fixing member configured in such a fashion that a plurality of pipe fixing bores and a plurality of band fitting bores are formed in a body thereof so as to enable easy and firm fixation of pipes arranged to cross each other, resulting in reduction in vibration of the pipes caused by the operation of a compressor.

Further, consistent with the present invention, tightening bands are used to surround and be tightened around the pipes, thereby increasing the coupling force of the pipes arranged to cross each other, resulting in stable and reliable fixation thereof.

Although the exemplary embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

[1. A pipe fixing device comprising a plurality of pipes arranged to cross each other, and a fixing member for fixing the plurality of pipes, the fixing member comprising:

a body;

a plurality of fixing bores formed in the body corresponding to arrangement of the plurality of pipes; and a plurality of fitting bores formed in the body corresponding to arrangement of the plurality of pipes, wherein the pipe fixing device further comprises a plurality of bands configured to secure the plurality of pipes to the body, and a plurality of recesses formed at the body thereof for preventing movement of the plurality of bands.]

[2. The device according to claim 1, wherein the plurality of fixing bores are formed in a longitudinal direction of the respective pipes; and the plurality of fitting bores are formed in a diametrical direction of the respective pipes.]

[3. The device according to claim 1, wherein one of the plurality of fixing bores and one of the plurality of fitting bores form a pair with each other, the fixing bore and the fitting bore of the pair being formed to cross each other.]

[4. A pipe fixing device comprising a fixing member for fixing first and second pipes arranged to cross each other, the fixing member comprising:

a body;

a first fixing bore vertically perforated through the body operable to fix the first pipe to the body;

a first fitting bore horizontally perforated through the body near the first fixing bore so as to cross thereto;

a second fixing bore horizontally perforated through the body operable to fix the second pipe to the body; and a second fitting bore vertically perforated through the body near the second fixing bore so as to cross thereto, wherein to the first fitting bore is fitted a first band operable to secure the body to the first pipe, and to the second fitting bore is fitted a second band operable to secure the body to the second pipe, wherein the first and second bands are provided around the fixing member, the fixing member further comprising a plurality of recesses formed at the body thereof for preventing movement of the first and second bands.]

[5. The device according to claim 4, wherein the fixing member further comprises slits formed at one side of the respective first and second fixing bores operable to allow insertion of the first and second pipes.]

[6. A pipe fixing device comprising a plurality of pipes arranged to cross each other, and a fixing member for fixing the plurality of pipes, the fixing member comprising:

a body;

a plurality of fixing bores formed in the body corresponding to arrangement of the plurality of pipes;

a plurality of fitting bores formed in the body corresponding to arrangement of the plurality of pipes; and a plurality of bands configured to secure the plurality of pipes to the body by exerting compressive force on the plurality of pipes and the body, and a plurality of recesses formed at the body thereof for preventing movement of the plurality of bands which extends through the recesses.]

[7. The device according to claim 6, wherein to the plurality of fitting bores is fitted the plurality of bands operable to secure the body to the plurality of pipes.]

*8. An air conditioner comprising:*

*a compressor and a heat exchanger mounted inside a casing;*

*a plurality of pipes comprising a first pipe and a second pipe arranged to cross each other; and*

*a pipe fixing device configured to fix the first pipe and the second pipe between the compressor and the heat exchanger, the pipe fixing device comprising:*

*a body made of a rubber material to reduce vibration of the first and second pipes, a first fixing bore perforated through the body, a first slit formed with respect to the first fixing bore, the first slit being operable to allow insertion of the first pipe to the body, a first fitting bore perforated through the body near the first fixing bore so as to cross thereto, a second fixing bore perforated through the body, a second slit formed with respect to the second fixing bore, the second slit being operable to allow insertion of the second pipe to the body, and a second fitting bore perforated through the body near the second fixing bore so as to cross thereto, wherein the body further comprising a first recess and a second recess formed in relation to the first and second fitting bores;*

*a first tightening band fitted to the first fitting bore to secure the body to the first pipe, the first tightening band being configured to be inserted through the first fitting bore such that the first tightening band surrounds the first pipe to tighten a first portion of the body around the first pipe, wherein the first recess is for preventing movement of the first tightening band; and*

*a second tightening band fitted to the second fitting bore to secure the body to the second pipe, the second tightening band being configured to be inserted through the second fitting bore such that the second tightening band surrounds the second pipe, which is arranged to cross with respect to the first pipe, to tighten a second portion of the body around the second pipe, wherein the second recess is for preventing movement of the second tightening band.*

*9. The air conditioner according to claim 8, wherein each of the first tightening band and the second tightening band comprises a cable-tie.*

*10. The air conditioner according to claim 8, wherein the first fixing bore and the second fitting bore extend from a first side of the body to a second side opposite to the first side of the body, and*

*wherein the first fitting bore and the second fixing bore extend from a third side of the body to a fourth side opposite to the third side of the body, the third and fourth sides extending perpendicular to the first and second sides.*

*11. The air conditioner according to claim 10, wherein the first tightening band wraps around the body from the third side to the fourth side, and*

*wherein the second tightening band wraps around the body from the first side to the second side.*

*12. The air conditioner according to claim 10, wherein the first recess is formed in the body and extends from the third side to the fourth side, and the second recess is formed in the body and extends from the first side to the second side.*

* * * * *